Aug. 25, 1970   R. H. RINGSTAD   3,525,904
A.C. REVERSE CURRENT MONITOR
Filed July 12, 1968   2 Sheets-Sheet 1

INVENTOR:
RALPH H. RINGSTAL
BY
ATTORNEYS

Aug. 25, 1970 R. H. RINGSTAD 3,525,904
A.C. REVERSE CURRENT MONITOR
Filed July 12, 1968 2 Sheets-Sheet 2
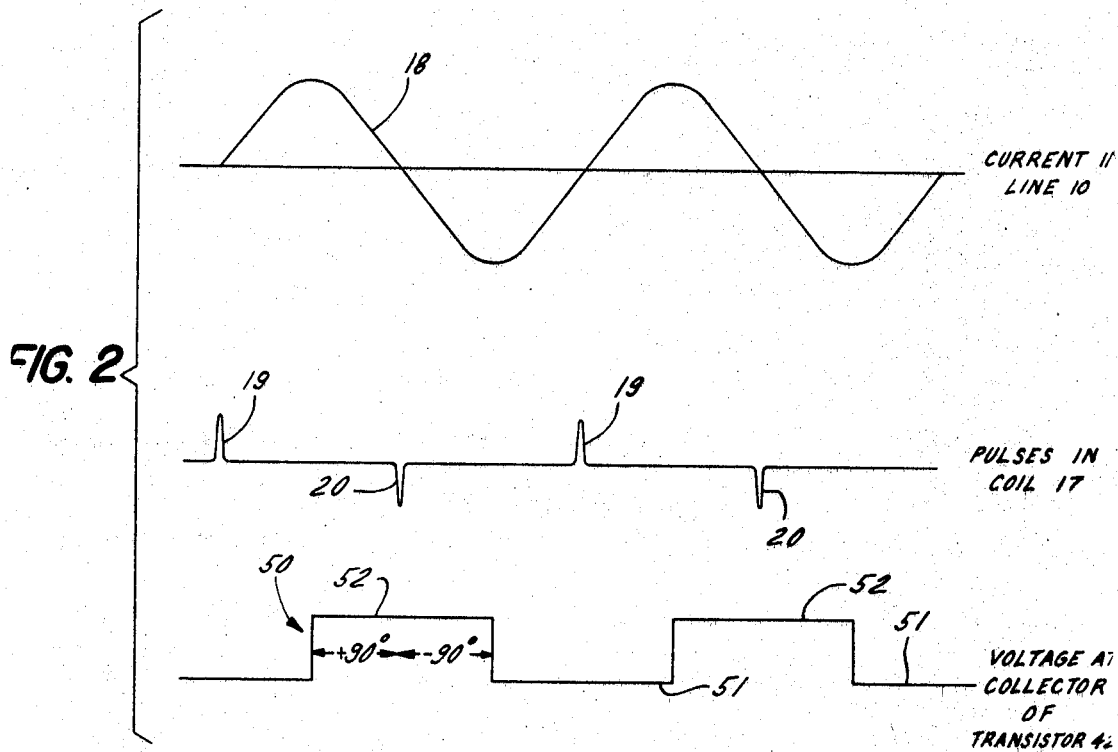
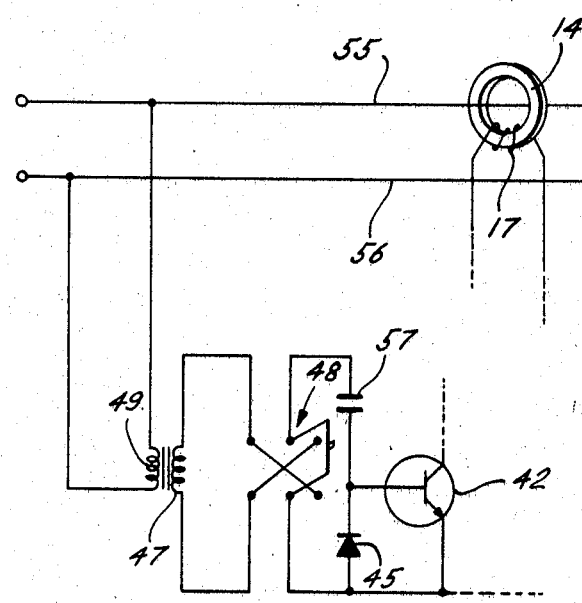
INVENTOR:
RALPH H. RINGSTAD
BY
Breitenfeld & Levine
ATTORNEYS

United States Patent Office 3,525,904
Patented Aug. 25, 1970

3,525,904
A.C. REVERSE CURRENT MONITOR
Ralph H. Ringstad, Whippany, N.J., assignor to Automatic Switch Company, a corporation of New York
Filed July 12, 1968, Ser. No. 744,579
Int. Cl. H02h 3/28, 5/00
U.S. Cl. 317—43                    9 Claims

ABSTRACT OF THE DISCLOSURE

Monitor senses when current in a line becomes more than 90° out of phase with the voltage in the line. Means, such as a transformer, associated with line produces a pulse at a predetermined point during each cycle of current. Means arranged to conduct upon receiving each pulse, and thereby produce a signal, but a sceond means is arranged to clamp the pulses during the voltage quarter cycles before and after the point of the voltage cycle which would correspond to the predetermined point of the current cycle at unity power factor.

---

This invention relates to transmission of alternating current electric power, and more particularly to means for detecting a current reversal in a line carrying such power.

Since, as is known, the absolute direction of current in a line carrying A.C. 60 cycle power changes 120 times per second, the term "current reversal" should be explained. When the current in an A.C. line leads the voltage by less than 90° (due to a capacitive load) or lags the voltage by less than 90° (due to an inductive load) the current may be thought of as flowing in a forward direction because power is flowing from the generator to the load. However, should the current for some reason lead or lag the voltage by more than 90°, the current direction may be considered "reversed" since power is under such circumstances flowing from the load toward the generator.

Current reversal can occur in a variety of situations, but one of the most important involves power generating stations in which a number of generators operating in synchronism are connected in parallel, and simultaneously feed power, to a common bus. In the event that the prime mover operating one of the generators fails, the system is adversely affected for two reasons. First, the generator discontinues supplying power to the bus, and second, the generator takes on the character of a large motor and actually starts drawing power from the bus. Thus, the current in the lines between the generator with the defective prime mover and the bus has reversed. It is obviously important to quickly detect such a situation, and automatically disconnect the failed generator from the bus so as to minimize the power reduction caused by the failure, and minimize the chance of damage to the prime mover as a result of it being driven by the motorized generator.

In the past, detection of such a failure, and disconnection of the offending generator has been accomplished by a relay adapted to sense reversal of power. However, power-responsive monitors, i.e., those which sense a product of the current and voltage in the line, present a number of problems. For example, these prior art devices must be adjusted to sense only reverse power flow which exceeds some minimum value, so that the relay is not tripped during normal temporary power reversals. Consequently, should the reverse power flow be very small after a failure, the abnormal situation is not sensed by the reverse power monitor and the relay is not tripped. Very low reverse power occurs at low reverse power factors, i.e., when the current leads or lags the voltage by only a little more than 90°. Reverse power factor may be kept low when a prime mover does not fail completely but continues to provide a minimum amount of power sufficient to overcome friction. Also, when a generator has an overexcited field the reverse power factor may remain low even if its prime mover fails completely.

It is an object of the present invention to overcome such problems by providing a monitor capable of sensing a current reversal regardless of how small the reverse power factor.

This objective is accomplished, according to this invention, by providing a monitor sensitive to reverse current rather than to reverse power. More specifically, the present monitor is responsive to the phase relationship between the line current and line voltage, and is capable of producing a signal, which may actuate a disconnect relay, as soon as the current begins to lead or lag the voltage by more than 90°.

In general, the invention comprises means associated with a line carrying A.C. power for producing a pulse at a predetermined point during each current cycle in the line. This means may be a coil-carrying toroid surrounding the line. Means, which may include a transistor, are responsive to the pulses for producing a singal capable of actuating a relay. Additional means are controlled by a voltage corresponding to the voltage in the line but shifted by 90°. This additional means provides a gate which opens and closes during alternate half cycles of the line current, and serves to prevent the pulses from reaching the signal-producing means as long as the line current remains less than 90° out of phase with the line voltage. As soon as the current moves more than 90° out of phase with the voltage, however, the gate is ineffective to prevent the pulses from passing to the signal-producing means.

Preferred embodiments of the invention will now be described in more detail with reference to the accompanying drawings, in which:

FIG. 2 is a diagram showing the time relationship between line current, pulses, and gate condition; and FIG. 3 is a fragmentary schematic diagram of an alternative form of monitor employed with a single phase system.

Figure 1:
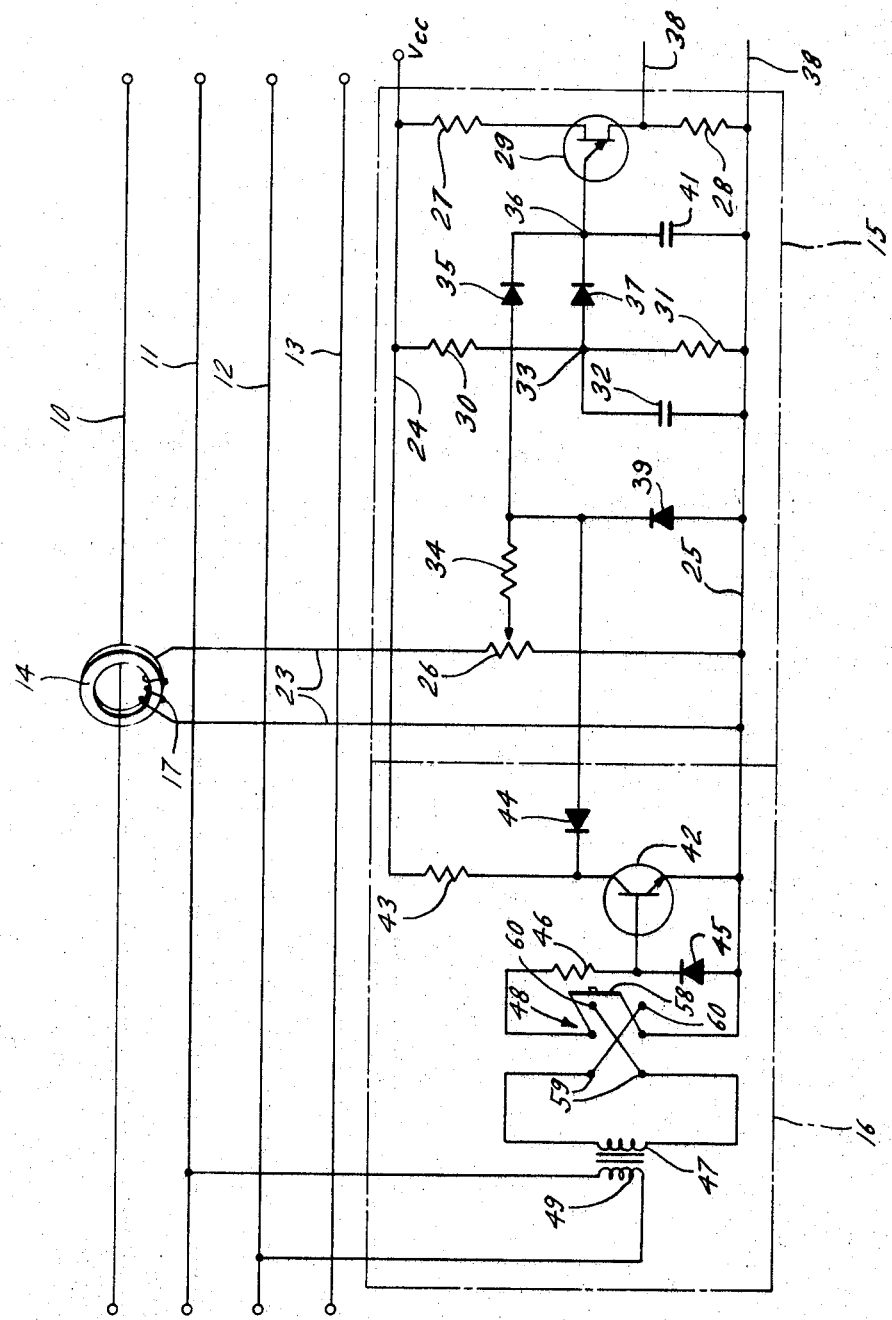
FIG. 1 is a schematic diagram of a reverse current monitor according to this invention employed with a three phase, four wire system.

In FIG. 1, a monitor chosen to illustrate this invention is shown associated with a three phase, four line transmission system. Each of the lines 10, 11, and 12 carries one of the phases, and line 13 is a neutral. The lines 10–13 may be lines extending from a bus to one of several generators connected in parallel to the bus. However, the invention is of course not limited to this particular environment. The monitor comprises, generally, means including a toroid 14 for producing pulses, means surrounded by the broken line 15 responsive to the pulses for producing a signal, and means surrounded by the line 16 for selectively interrupting the transmission of pulses to means 15.

The toroid 14 surrounds only one line of the system, in this example the line 10, and forms the core of a small transformer. The primary of the transformer is the line 10, and the secondary is the coil 17 carried by the toroid 14. The toroid is, of course, insulated from both line 10 and coil 17, and is preferably formed of a material which requires very little current in line 10 to fully saturate the toroid. As a result, very soon after (in fact practically at the same time as) the current passes through each of its zero points, a pulse is produced in the coil 17. This relationship is indicated in FIG. 2. When the current 18 is moving in a positive direction, a positive pulse 19 is produced, and when the current 18 is moving in a negative direction, a negative pulse 20 is produced. Thus, one positive and one negative pulse are produced during each cycle of the current.

It is desirable to employ a toroid which saturates fully at a very low current because this insures that the pulses 19 and 20 will be produced at the same points, i.e., substantially the zero points, during each current cycle, regardless of how the current amplitude may change due, for example, to change in the load supplied by the system. If the toroid required a relatively high current to saturate it, the points at which the pulses occur during the current cycle might vary considerably with variations in current amplitude. Since in this invention, the pulses 19 and 20 are used to indicate the relative phase of the current 18, as will be seen hereinafter, shifting of the points in the current cycle at which the pulses are produced would appear to indicate shifts in the relative phase of the current although no such change in phase may have actually taken place.

The pulses 19 and 20 are transmitted, via conductors 23, to the signal-producing means 15 arranged across lines 24 and 25 connected, respectively, to the terminals of a D.C. power source Vcc. This source may, for example, be 12 volts D.C. One of the conductors 23 includes a potentiometer 26, the resistor of which serves as a load for the coil 17. The potentiometer 26 also serves as a current amplitude trip adjustment, i.e., by adjusting the setting of the potentiometer, the signal-producing means may be rendered insensitive to pulses from coil 17 having amplitudes below a desired value determined by the adjustment. Consequently, small, temporary reverse currents which normally occur in certain systems, and which do not indicate a malfunction, are incapable of affecting the signal-producing means 15.

Two resistors 27 and 28 and a unijunction transistor 29 are connected in series between the lines 24 and 25, each resistor being connected to one of the base terminals of the transistor. Two additional resistors 30 and 31 are connected in series between lines 24 and 25, and a capacitor 32 is connected between line 25 and a junction 33 located between the resistors 30 and 31. Potentiometer 26 is connected via a current limiting resistor 34 and a diode 35 to the third terminal of the transistor 29 through a junction 36. A diode 37 is connected between junctions 33 and 36. The resistor 34 is also connected to line 25 via a diode 39.

Resistors 30 and 31 constitute a voltage divider by means of which a constant D.C. voltage is maintained across capacitor 32. This voltage is not sufficient to cause the unijunction transistor 29 to conduct continuously, but when the transistor does fire, the capacitor discharges via diode 37, transistor 29, and resistor 28, thereby developing a usable signal across resistor 28. This signal may be transmitted by conductors 38 to any suitable circuitry, such as a relay for disconnecting a generator, feeding lines 10–13, from its bus.

The circuit may be designed so that only positive pulses or only negative pulses from toroid 14 will cause the transistor 29 to fire. Hence, only one pulse per cycle of current in line 10 has the potential of causing transistor 29 to fire. In the present example, only positive pulses can cause firing of the transistor 29. When a positive pulse of sufficient amplitude reaches potentiometer 26, it is transmitted via resistor 34 and diode 35 to junction 36 thereby raising the voltage level of this junction above its normal value, determined by resistors 30 and 31. In this condition, diode 37 decouples junction 36 from junction 33 thereby preventing current flow from junction 36 to capacitor 32 and resistors 30 and 31. Transistor 29 is thereupon caused to fire, whereupon capacitor 32 discharges through resistor 28, as mentioned above, producing a signal.

A capacitor 41 is provided between junction 36 and line 25 to make transistor 29 less sensitive to stray transients, and resistor 27 is used for temperature compensating transistor 29.

As thus far described, the arrangement would produce an output signal across resistor 28 during each cycle of current in line 10. However, means 16 are provided to interrupt the flow of positive pulses to the transistor 29 when current is flowing in a forward direction in line 10, and to allow such pulses to reach transistor 29 when a current reversal occurs in line 10. The interrupting means 16 includes a transistor 42, the emitter and collector of which are connected in series with a collector load resistor 43 between lines 24 and 25. A circuit including a diode 44 serves as the link between means 15 and 16, and is connected between two junctions, one junction being located between resistor 34 and diode 35, and the other between transistor 42 and resistor 43. The base to emitter circuit of transistor 42 is connected across a diode 45. The diode 45, a resistor 46, and the secondary 47 of a transformer are connected in series via a double-pole double-throw switch 48. The primary 49 of the transformer is connected across the power lines 11 and 12.

The resistor 46 serves to current limit the base to emitter circuit of transistor 42, and diode 45 prevents the base to emitter voltage from going more than a certain voltage, e.g., 0.7 volt, in the negative direction. As a result of the arrangement just described, the voltage waveform 50 (see FIG. 2) at the collector of transistor 42 is substantially a square wave having equal half-cycle periods of on and off duration. During the half cycle periods that the transistor 42 conducts, it clamps the pulses from the toroid 14, i.e., these pulses are conducted by potentiometer 26, resistor 34, diode 44, and transistor 42 to line 25. Consequently, the pulses do not flow through diode 35 to junction 36 and transistor 29, and hence no signal is produced across resistor 28. During the half cycle periods that the transistor 42 does not conduct, the diode 44 decouples transistor 42 from resistor 34, and pulses are permitted to pass to transistor 29, and if of sufficient magnitude to fire the latter and produce an output signal across resistor 28.

To accomplish the result sought by this invention, a particular relationship between the pulses from toroid 14 and the on and off periods of transistor 42 is established. This is accomplished by connecting the transformer primary 49 across lines 11 and 12. Since the voltage in the three lines 10–12 are 120° out of phase with one another, the resultant voltage applied to the base of transistor 42 is 90° out of phase with the voltage in line 10. Thus, if the current and voltage in line 10 were in phase, i.e., if the load were purely resistive making the power factor unity, the voltage applied to the base of transistor 42 would be 90° out of phase with the current in line 10. Consequently, assuming a case of unity power factor, the relationship between the pulses 19 and 20 and the on and off periods of transistor 42 would be as illustrated in FIG. 2. Specifically, each positive pulse 19 would appear substantially at the center of each half cycle 51 during which the transistor 42 conducts, and each negative pulse would appear substantially at the center of each half cycle 52 during which the transistor 42 is nonconductive. In other terms, each half cycle 51 of transistor 42 collector voltage corresponds to a half cycle of voltage in line 10 consisting of quarter cycles immediately before and after the point of the voltage cycle coincident with the point of the corresponding current cycle at which a positive pulse 19 is produced, when the current and voltage are in phase. Under such circumstances, each positive pulse 19 is clamped, and since only positive pulses can fire transistor 29, no output signal is produced. Negative pulses never reach transistor 29 since they flow from resistor 34 to line 25 via diode 39.

It will be appreciated, from inspecting the diagrams of pulses 19 and 20 and collector voltage of transistor 42 in FIG. 2, that positive pulses 19 may move up to 90° to the right or left in FIG. 2, i.e., the current in line 10 may lag or lead the voltage in line 10 by up to 90°, without altering the fact that no pulse 19 can get through to transistor 29. Thus, as long as the current flows in the forward direction, no output signal is produced by the monitor. However, as soon as a positive pulse 19 moves more than 90° to the right or left, indicating a shift of current in line 10 of more than 903 with respect to the voltage in line 10, which is, of course, a reverse current situation, the pulse 19 will be adjacent to a half cycle 52 during which transistor 42 does not conduct. Hence, the pulse 19 will not be clamped, but instead will flow to transistor 29, and if of sufficient amplitude will fire transistor 29 thus producing an output signal across resistor 28.

It will be noted that positive pulses 19 are allowed to flow to transistor 29 as soon as the current in line 10 shifts more than 90° with respect to the voltage in line 10, even if the shift exceeds 90° by a relatively small amount. Since a relative shift of 180° between current and voltage corresponds to a reverse power factor of unity, it can be seen that the present monitor reacts even at very low reverse power factors. It should also be pointed out that since a positive pulse, capable of causing an output signal at resistor 28, is produced at the very beginning of each current cycle, it is not necessary to wait for all or a major portion of the current cycle to elapse before extracting a signal indicating a current reversal. This makes it possible for the present invention to provide extremely rapid "read-out" in relation to current amplitude, an advantage which is highly desirable in certain reverse current applications.

The switch 48 serves simply as a test switch. When the monitor is in operation, the movable contacts 58 engage stationary contacts 59. However, if it is desired to test the circuits to be sure they are operational, the contacts 58 are swung into engagement with the stationary contacts 60. This serves to shift the voltage applied to transistor 42 by 180°. Consequently, the half cycles 52 when the transistor 42 does not conduct will now appear, assuming a forward current condition, opposite the positive pulses 19, and each pulse will be transmitted to transistor 29 to produce an output signal.

The embodiment shown in FIG. 1 illustrates the invention associated with a three phase power transmission system. The invention may be used with equal effectiveness with a single phase, two line A.C. power transmission system, as shown in FIG. 3, the two wires of the system being designated 55 and 46. Only a portion of the monitor is shown in FIG. 3 since it is almost identical to the arrangement of FIG. 1. The only difference between the two arrangements involves the manner in which the base of transistor 42 has applied to it a voltage 90° out of phase with the voltage in the line 55 being monitored. This is accomplished by replacing the resistor 46 of FIG. 1 with a capacitor 57. With the transformer primary 49 connected across the lines 55 and 56 as shown, the capacitor 57 serves to shift the voltage applied to transistor 42 by 90°. The circuit of FIG. 3 will then operate in precisely the same manner as the circuit of FIG. 1.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A device for detecting the direction of current flow in a line carrying alternating current power, comprising means associated with said line for producing a pulse at a predetermined point during each complete cycle of the current in the line, means adapted to produce an output signal in response to each of said pulses, and means for interrupting the transmission of said pulses to said responsive means during alternate half cycles of the voltage in the line, said interrupting means performing said interrupting during alternate half cycles consisting of the quarter cycles immediately before and after the point of the voltage cycle which would correspond to said predetermined point of the current cycle if the voltage and current were in phase, said interrupting means interrupting the transmission of pulses to said responsive means when the current in the line is 90° or less out of phase with the voltage and permitting the transmission of said pulses to said responsive means when the current becomes more than 90° out of phase with the voltage, said responsive means producing an output signal upon receipt of one of said pulses.

2. A detector as defined in claim 1 wherein said pulse-producing means includes a transformer comprising a toroid of magnetic material surrounding said line, whereby said line serves as the primary of the transformer, and a secondary winding carried by said toroid, said toroid being formed of material which is saturated by a very small current in said line, whereby said pulses are produced in said secondary almost at the instant the current passes through its zero condition.

3. A detector as defined in claim 2 wherein two pulses are produced during each complete cycle of the current, and including means for rendering alternate pulses ineffective for causing said responsive-means to produce an output signal, whereby said responsive means is adapted to respond to only one pulse per cycle.

4. A detector as defined in claim 1 including means for adjusting the value of the pulse transmitted to said responsive means, whereby said responsive means can be made insensitive to pulses below a minimum value.

5. A detector as defined in claim 1 wherein said responsive means includes a transistor and a capacitor connected in series, direct current means for charging said capacitor, and means adapted to apply said pulses to said transistor to cause the latter to conduct, whereupon said capacitor discharges through said transistor to produce the output signal.

6. A detector as defined in claim 1 including a first circuit between said pulse-producing means and said signal-producing means, and wherein said interrupting means includes a second circuit connected to said first circuit and arranged in parallel with said signal-producing means, and means in said second circuit for making the latter conductive during only said alternate half cycles.

7. A detector as defined in claim 6 wherein said means in said second circuit is a transistor, and including means for making said transistor conductive during only said alternate half cycles.

8. A detector as defined in claim 7 wherein the line being monitored is one of three such lines in a three phase system, and said last-mentioned means includes a transformer having a primary connected across the two lines other than the one being monitored, the transformer secondary being connected to said transistor.

9. A detector as defined in claim 7 wherein the line being monitored is one of two such lines in a single phase system, and said last-mentioned means includes a transformer having a primary connected across the two lines, and a capacitor connected in series with the transformer secondary and said transistor.

References Cited

UNITED STATES PATENTS

| | | | |
|---|---|---|---|
| 2,981,867 | 4/1961 | Hopkins | 317—43 X |
| 3,358,189 | 12/1967 | Philippidis | 317—43 X |
| 3,417,293 | 12/1968 | Peaslee et al. | 317—43 |
| 3,453,495 | 7/1969 | Thomas | 317—43 X |

J D MILLER, Primary Examiner

HARVEY FENDELMAN, Assistant Examiner

U.S. Cl. X.R.

307—127; 317—27, 39